March 25, 1930.  A. N. MERLE  1,751,593

FILM HOLDER

Filed Feb. 7, 1925

André Noël Merle
INVENTOR

By Otto Munk
his ATTORNEY

Patented Mar. 25, 1930

1,751,593

UNITED STATES PATENT OFFICE

ANDRÉ NOËL MERLE, OF PARIS, FRANCE, ASSIGNOR TO PATHÉ CINEMA, ANCIENS ETABLISSEMENTS PATHÉ FRERES, OF PARIS, FRANCE

FILM HOLDER

Application filed February 7, 1925, Serial No. 7,714, and in France June 28, 1924.

The film holders which, in cameras, are designed for containing the blank or unexposed film, or adapted to receive the exposed film, are provided with suitable slots for the entrance and the exit of the film which should be perfectly light tight in order to prevent any damage to the film.

In order to obtain the proper light-tight conditions, such slots are usually lined with velvet or felt which however will become worn after a time. The known arrangements proposed as a substitute for this lining are either insufficient or too complicated.

The present invention relates to a holder for exposed or unexposed film which is perfectly light-tight and will obviate the drawbacks observed in the known devices. The said film holder is essentially characterized by the use of curved passages adapted to guide the film when the latter enters or leaves the holder, and to prevent, without the use of auxiliary mechanical or other means, all light from entering the holder.

Another feature of the invention resides in that the cross section of the said passages has preferably an elliptical or analogous form, for the purpose of obviating all friction of the emulsioned face of the film upon the side walls of the said passages.

The film holder according to the invention may be employed to contain a bobbin of unexposed film or to receive the exposed film leaving the camera. It may also be arranged so as to contain two bobbins, one exposed and the other unexposed, formed of a single film which is unwound from the first bobbin in order to constitute the second bobbin after proceeding upon an outer path.

This particular application will be described hereinafter, by way of example of a constructional form of the device according to the invention and to illustrate the latter in the proper manner. The following description is given with reference to the appended drawings wherein.

Figure 1:
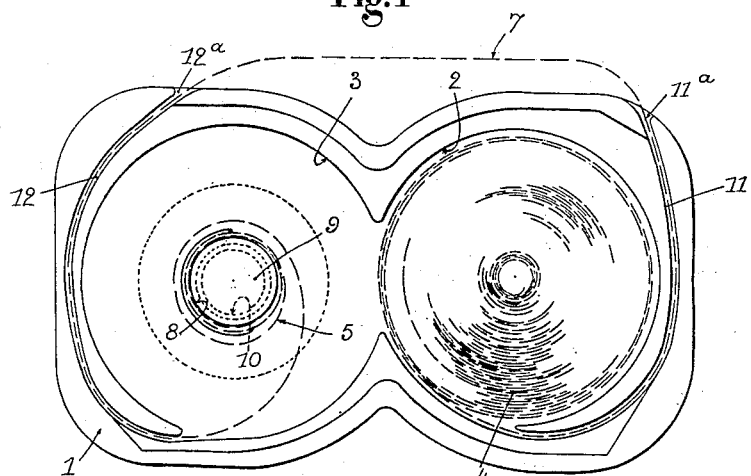
Fig. 1 is a plan view of a film holder according to the invention, with the cover removed and the film being shown in place in the holder.
Figure 2:
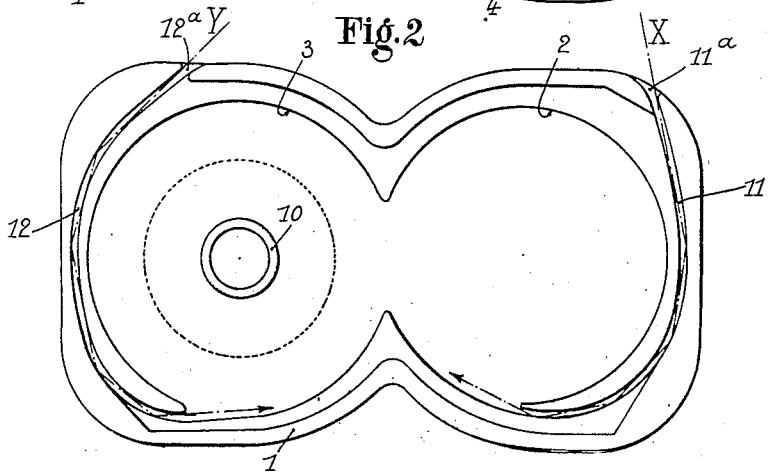
Fig. 2 is a like view, but without the film, the path of the rays of light within the curved passages being indicated.
Figure 3:
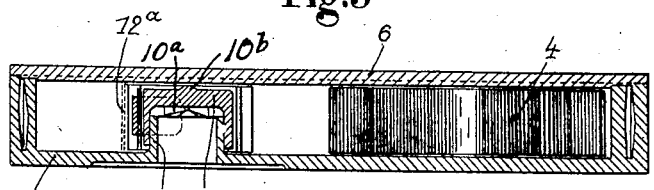
Fig. 3 is a vertical longitudinal section of the film holder and cover, with the film in position in the holder.

The film holder according to the invention as shown in Figs. 1 to 3 comprises the box or body 1 in which are formed two recesses 2 and 3 respectively adapted to contain the unwinding bobbin 4 and the winding bobbin 5 and a cover 6 which may be secured to the body 1 by any suitable means. The film constituting the two bobbins 4 and 5 is indicated by the reference 7.

The unwinding bobbin 4 is disposed loosely within the recess 2, whilst the end 8 of the film is attached to a cap 9 fitted upon a socket 10 which is integral with the body 1. By acting from the exterior, by any known means, upon the said cap, the film will be unwound from the bobbin 4 in order to constitute the bobin 5, said cap being fitted upon the socket 10 in a light-tight manner so as to prevent all light from entering through this part of the holder. As best shown in Figure 3, the cap is preferably provided with teeth, 10ª, for engaging with a driving element when inserted through the socket. The cap 9 is also provided with a projection 10ᵇ on its top end. This projection is positioned axially and the cover strikes it when in place, serving to urge the cap in on the socket. The projection serves as a bearing for the cap on the cover, concentrates the abutment of the cap on the cover on a substantial axial point, and allows easy retard of the cap without appreicable friction.

The film 7 is guided, when proceeding from the unwinding bobbin to the exterior, by a suitable passage 11 provided within the side wall of the holder, and after the exposure, the film is guided towards the winding bobbin by means of a second and like passage 12.

It is observed in Figs. 1 and 2 that the passages 11 and 12 have a relatively considerable length and a marked curvature. Due to this arrangement, the light rays such as the rays X and Y, Fig. 2, are reflected several times when proceeding towards the recesses 1 and 2 provided for the bobbins, so that they are practically arrested before attaining the said bobbins, and all fogging of the film by the action of light will thus be obviated.

In principle, any suitable cross section can be given to the said passages, but an elliptical or analogous cross section will be preferably employed, as shown in Fig. 3, so that the film will be only in contact at its edges with the guiding surfaces, both when leaving the holder through the slot 11ª and when entering the holder through the slot 12ª, so that the friction which opposes the motion of the film will be reduced to a minimum, and all alteration of the sensitized surface of the film, due to its friction against the side walls of the passages, is avoided.

The curved passages for guiding the film which are provided within the material of the side walls of the film holder are not necessarily formed solely in the body 1 of the said holder. To facilitate the manufacture, and chiefly when the cross section of the passage is enlarged at the middle part, as above indicated, the said passages may be formed partly in the body of the holder and partly in the cover of the said holder. By this constructions, the cleaning of the passages will be also facilitated.

Figure 4:
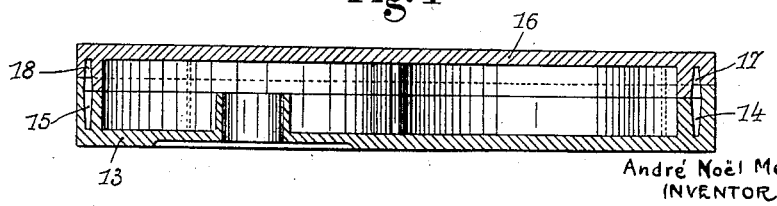
Fig. 4 is a like view showing a modification, but without the film.

Fig. 4 is a vertical section of a film holder in which this latter arrangement is employed; it will be noted that the body of the holder 13 comprises the two lower half-passages 14 and 15 whilst the cover 16 comprises the two upper half-passages 17 and 18, the said half-passages being adapted to register with one another. A light-tight fitting of the cover upon the holder can be readily and efficiently obtained by assembling the two parts by means of a joint with a single step, Fig. 4, or optionally with a double step, Fig. 3.

Any suitable material may be employed in the manufacture of the film holders according to the invention, such as wood, metal or the like, and in particular substances which can be properly moulded may be employed.

Obviously, the arrangements hereinbefore set forth are given solely by way of example of a particular embodiment of the invention, and the latter is in no wise limited to the constructional forms herein represented.

Having now described my invention, what I claim as new and desire to secure by Letters Patent is:

1. An article of the class described comprising a box having an inner space adapted to contain a roll of film, a hollow socket on the inner wall of the box, a cap adapted for removable disposition on said socket within said box, means for attaching the end of the film to the exterior of the cap, and teeth on the interior of the cap adapted for engagement with a driving element inserted through the socket.

2. An article of the class described comprising a box having two compartments and openings in the side walls of the compartments, one of the compartments being adapted to receive a roll of film, the film passing through the wall openings into the second compartment, a hollow socket on the inner wall of the second compartment, a cap adapted for removable disposition on said socket within the second compartment, means for attaching the end of the film to the exterior of the cap, and means on the interior of the cap adapted for engagement with a driving element inserted through the socket.

3. An article of the class described comprising a box having two compartments and openings in the side walls of the compartments, one of the compartments being adapted to receive a roll of film, the film passing through the wall openings into the second compartment, a cap adapted for removable disposition on said socket within the second compartment, means for attaching the end of the film to the exterior of the cap, means on the interior of the cap adapted for engagement with a driving element inserted through the socket, a projection on the top end of the cap positioned axially of the cap, and a cover for the box striking the projection when in closed position.

4. An article of the class described comprising a box having an inner space adapted to contain a roll of film, a socket on the inner wall of the box, a cap adapted for removable disposition on said socket within said box, means for attaching the end of the film to the exterior of the cap, a projection on the top end of the cap positioned axially of the cap, and a cover for the box striking the projection when in closed position.

5. An article of the class described comprising a box having an inner space adapted to contain a roll of film, a hollow socket on the inner wall of the box, a cap adapted for removable disposition on said socket within said box, means for attaching the end of the film to the exterior of the cap, teeth on the interior of the cap adapted for engagement with a driving element inserted through the socket, a projection on the top end of the cap positioned axially of the cap, and a cover for the box striking the projection when in closed position.

In testimony whereof I have signed my name to this specification.

ANDRÉ NOËL MERLE.